United States Patent [19]

Gill

[11] Patent Number: 4,967,793

[45] Date of Patent: Nov. 6, 1990

[54] COMPACT MULTI-STAGE PRESSURE REDUCING VALVE

[76] Inventor: Ajit S. Gill, 4169 Bennion Rd., Salt Lake City, Utah 84119

[21] Appl. No.: 340,898

[22] Filed: Apr. 19, 1989

Related U.S. Application Data

[63] Continuation-in-part of Ser. No. 167,861, Mar. 14, 1988, abandoned.

[51] Int. Cl.⁵ .............................................. F16K 37/00
[52] U.S. Cl. .................................. 137/557; 137/599; 251/61.1; 251/249.5
[58] Field of Search .................. 137/614.21, 599, 557; 251/249.5, 229, 61.1, 250, 62

[56] References Cited

U.S. PATENT DOCUMENTS

| | | | |
|---|---|---|---|
| 1,441,784 | 1/1923 | Clayton | 251/229 |
| 2,265,435 | 12/1941 | Kinzie et al. | 251/229 |
| 2,881,687 | 4/1959 | Manor | 251/61.1 |
| 2,907,346 | 10/1959 | Fortune | 137/599 |
| 2,970,806 | 2/1961 | Rexford et al. | 137/614.21 |
| 3,312,241 | 4/1967 | Bryant | 137/599 |
| 3,490,379 | 1/1970 | Laing | 251/249.5 |
| 3,746,041 | 7/1973 | Friedland | 137/599 |
| 3,792,720 | 2/1974 | Robbins | 251/61.1 |
| 4,019,533 | 4/1977 | Jerde et al. | 137/599 |
| 4,186,764 | 2/1980 | Otterson et al. | 251/61.1 |
| 4,372,334 | 2/1983 | Paul, Jr. | 137/557 |

FOREIGN PATENT DOCUMENTS 331027 6/1930 United Kingdom ................ 137/599

OTHER PUBLICATIONS

Cla-Val Co. Product Data Catalog, 1971, pp. 14 and 15.
The Roll Seal Valve Company, Inc. Brochure for Control Valves.

*Primary Examiner*—A. Michael Chambers
*Attorney, Agent, or Firm*—Mallinckrodt & Mallinckrodt

[57] ABSTRACT

A flow control and pressure reducing valve has a valve body with an inlet chamber and outlet chamber separated by a partition plate. A plurality of passages are formed in the valve body spaced circumferentially around the partition plate and have an inlet portion opening into the inlet chamber and an outlet portion opening into the outlet chamber. Elastomeric flow control means are positioned in the passages and are responsive to pressurized fluid introduced therein to control flow of fluid through the passages around the partition plate. The valve configuration allows the mounting of inlet and outlet gates within the inlet and outlet chambers to eliminate the need for separate gate valves. An auxiliary flow passage may be provided through the partition plate and flow controlled therethrough to increase the flow capacity of the valve yet still provide full flow and pressure control. Air inlet and relief valves may also be provided as an integral part of the valve.

33 Claims, 9 Drawing Sheets

1

COMPACT MULTI-STAGE PRESSURE REDUCING VALVE

RELATED APPLICATIONS

This is a continuation-in-part of my copending application Ser. No.07/167,861, filed Mar. 14, 1988, now abandoned.

BACKGROUND OF THE INVENTION

1. Field:

The invention is in the field of flow control and pressure relief valves for controlling the flow of fluid through a pipe line.

2. State of the Art:

Various types of valves are currently in use to control the flow of fluids through a pipe line and to reduce the pressure of a fluid in a pipe line. Where pressure reducing valves are used, it is generally necessary to provide a separate gate valve upstream from the pressure reducing valve and a separate gate valve downstream from the pressuring reducing valve. Further, the pressure reducing valve itself generally has a significantly smaller inlet and outlet diameter than the diameter of the pipe line in which it is installed so that size reducers and other fittings are required to install such valves in the pipe line. When the pressure reducing valves fail, they fail completely, thus allowing flow of fluid through the valve at full pressure which can result in considerable damage to pipes or other items downstream of the valve which are suppose to be protected from such high pressures by the pressure reducing valve.

A common type of pressure reducing valve in use today has a passage that extends from the inlet of the valve, through a valve seat, to the outlet of the valve. A valve disc is positioned against the valve seat to block the flow passage through the valve when it is desired to stop flow of fluid therethrough, and is adjustably positioned a distance from the valve seat to open the passage a selected amount to allow controlled flow through the valve and controlled pressure reduction in the fluid flowing through the valve from inlet to outlet. This type of valve has the disadvantages of relatively large size and weight for a given flow volume and a number of mechanical parts that are subject to wear. Cla-Val Co. of Newport Beach, Calif. manufactures a valve of this type which has four separate valve seats with associated separate valve discs spaced about a valve body.

Rather than using a valve seat and associated valve disc, some valves, such as those manufactured by the Roll Seal Valve Company, Inc. of Temecula, Calif., use an elastomeric liner to control fluid flow. These valves include a valve seat extending circumferentially about the inside of the valve body with the liner extending about an inner portion of the valve body and inflatable so that when filled with a pressurized fluid, will press against the valve seat to close the flow passage through the valve. By controlling the pressure of the fluid in the liner, flow through the valve is controlled. The problem with this type of valve is that the liner can be ruptured or dislodged, thereby causing the valve to fail so pressure is no longer controlled downstream of the valve. Another problem is that if the liner ruptures or becomes dislodged, the valve must be removed in order to replace the liner.

SUMMARY OF THE INVENTION

According to the invention, a flow control and pressure reducing valve includes a valve body, preferably cast as a single piece, having an inlet chamber and an outlet chamber. Partition means, preferably integrally cast with the valve body, separates the inlet and outlet chambers. The valve body preferably is cylindrical in form with a central bore which is divided into the inlet chamber and outlet chamber by the partition means which preferably takes the form of a wall or plate extending perpendicularly to the axis of the central bore.

A plurality of passages are formed in the valve body spaced circumferentially around the partition means and extending through the valve body around the partition means from the inlet chamber to the outlet chamber. Each passage has an inlet portion opening into the inlet chamber adjacent one face of the partition means and an outlet portion opening into the outlet chamber adjacent the other face of the partition means. In addition to extending between the inlet and outlet chambers, the passages preferably also extend radially through the valve body to form an outside passage access opening on the outside surface of the valve body. The passages serve as receptacles for flow control means and preferably taper inwardly toward the inside of the valve body to take the form of truncated cones.

Elastomeric flow control means are positioned in the passages and are responsive to pressurized fluid introduced into the flow control means to controllaby restrict the passages. When operated to close a passage, the flow control means extends across the passage inlet and passage outlet portions and seats against the portion of the partition means between the inlet and outlet portions to thereby block the passage to prevent flow of fluid therethrough. In other positions, the flow control means is operated so that it is displaced from the portion of the partition means between the passage inlet and passage outlet portions to allow flow of fluid around the partition means. The distance the control means is displaced from the partition means determines the size of the flow passage and the amount of fluid allowed to flow around the partition means. The flow control means preferably take the form of elastomeric bladders configured to be snugly received in the passages. One side of the bladder extends across the passage inlet and passage outlet portions as described above, while the other end of the bladder extends across the outside access opening of the passage. The bladder is held in place by a cover extending across such outside opening. This cover may advantageously take the form of a ring extending about the valve body. While each passage may recieve a separate bladder, it is preferred that each bladder be configured to fit into several adjacent passages. Each bladder, whether configured to fit into individual passages or into several adjacent passages, has a means for supplying pressurized fluid thereto which generally will take the form of a connector for connection to a source of pressurized fluid. Pressurized fluid in the bladder controls operation of the bladder to control flow through the valve. The actual control of the valve may be accomplished with various well known valve control techniques.

In many cases it will be desireable to include gates within the valve to eliminate the need for separate gate valves located upstream and downstream from the pressure reducing valve. These gates can be operated to stop flow of fluid through the valve in case of a malfunction of the flow control means or its control system. When gates are to be used with the valve, gate mounting means is provided in the inlet chamber for mounting an inlet or upstream gate and in the outlet chamber for mounting an outlet or downstream gate. The gate mounting means advanteageously take the form of gate mounting shafts secured to the partition means and extending outwardly therefrom into both the inlet chamber and outlet chamber along the axis of the central bore of the valve body. In one embodiment of the invention, the gate mounting shafts are threaded and receive thereon mating, internally threaded mounting hubs of the gates. Means are then provided for rotating the gates to cause them to move along the gate mounting shafts either toward a closed position when the gate is adjacent the partition means or an open position when the gate is spaced from the partition means to allow flow of fluid between the gate and partition means. The gates may be driven individually through the direct engagement of a worm-rod with a handle at its end, or they may be driven simultaneously by means of a drive assembly including a worm-rod with handle at its end which drives a pinion and tie rod. The pinion drives one of the gates while the tie rod drives a second pinion which drives the other gate. For automatic operation of the gates, the gates may be driven by motors actuated by pressure sensor or various other controls.

In a second embodiment of the invention, the gate mounting shafts are smooth to accept mating, hollow shafts of the gate valves which can freely slide thereon. A gate control means, such as an hydraulic gate actuator, is provided to move the upstream gate along the gate mounting shaft against the force of the fluid flowing through the valve when it is desired to open the gate. The gate on the downstream side of the valve is provided as a check valve and is free to slide to its open position with the flow of fluid through the valve, but will slide to its closed position if any back flow of fluid through the valve starts to occur.

In order to increase the flow capacity through the valve, the valve of the invention can include an auxiliary flow passage through the partition means which is controlled by the positioning of the gates to allow additional controlled flow through the valve. In this way, flow of fluid through the valve can be significantly increased for a given size valve. The additional flow passage can also be arranged to serve as a pressure relief means.

An important advantage of the valve of the invention is that the elastomeric flow control means of the valve may be easily removed and replaced without having to remove the valve from the line. This is accomplished with the flow through the valve stopped by either the internal gates of the valve, or by other means if the valve is not provided with internal gates, by merely sliding the cover from over the outside access openings of the passages, removing the flow control means to be replaced, and inserting the new flow control means. The cover is then replaced to hold the flow control means in place. Further, since a plurality of separate flow control means are used, if one fails, it only effects a portion of the valve so the valve can still function and does not fail completely. The valve of the invention can incorporate a pressure sensor in communication with the passages to sense if a flow control means fails and produce a warning signal to indicate such failure.

The construction of the valves of the invention allow for incorporation of an air relief means to release air when the lines to which the valve is connected are being filled with fluid, and air inlet means to remove the vacuum which tends to form in the line downstream of the valve when the valve or other valves in the system are closed to stop flow of fluid. This eliminates the need for separate installation of such means.

THE DRAWINGS

In the accompanying drawings, which illustrate the best mode presently contemplated for carrying out the invention:

FIG. 1 is a transverse vertical section through the center of a valve of the invention;

FIG. 2, an axial vertical section taken on the line 2—2 of FIG. 1;

FIG. 3, an axial vertical section similar to that of FIG. 2, but showing the gates and their mounting shafts removed to show the interior of the valve body;

FIG. 4, a transverse vertical section similar to that of FIG. 1, but showing the gate and gate control means in phantom behind the partition plate of the valve and showing the flow control means removed;

FIG. 5, an axial vertical section similar to that of FIG. 2, but showing a different embodiment of the valve;

FIG. 6, a transverse vertical section similar to that of FIG. 1, but showing the valve of FIG. 5;

FIG. 7, an axial vertical section similar to that of FIG. 2, but showing another embodiment of the invention;

FIG. 8, an axial vertical section similar to that of FIG. 2, but showing yet another embodiment of the invention;

FIG. 9, a transverse vertical section taken on the line 9—9 of FIG. 8 and showing the outlet gate control means;

FIG. 10, a fragmentary transverse vertical section taken on the line 10—10 of FIG. 8;

FIG. 11, a fragmentary transverse vertical section taken on the line 11—11 of FIG. 8;

FIG. 12, a fragmentary top plan view of a portion of the threaded gate mounting shaft of FIG. 2; and FIG. 13, a fragmentary vertical transverse section taken on the line 13—13 of FIG. 2.

DETAILED DESCRIPTION OF THE ILLUSTRATED EMBODIMENT

Figure 1:
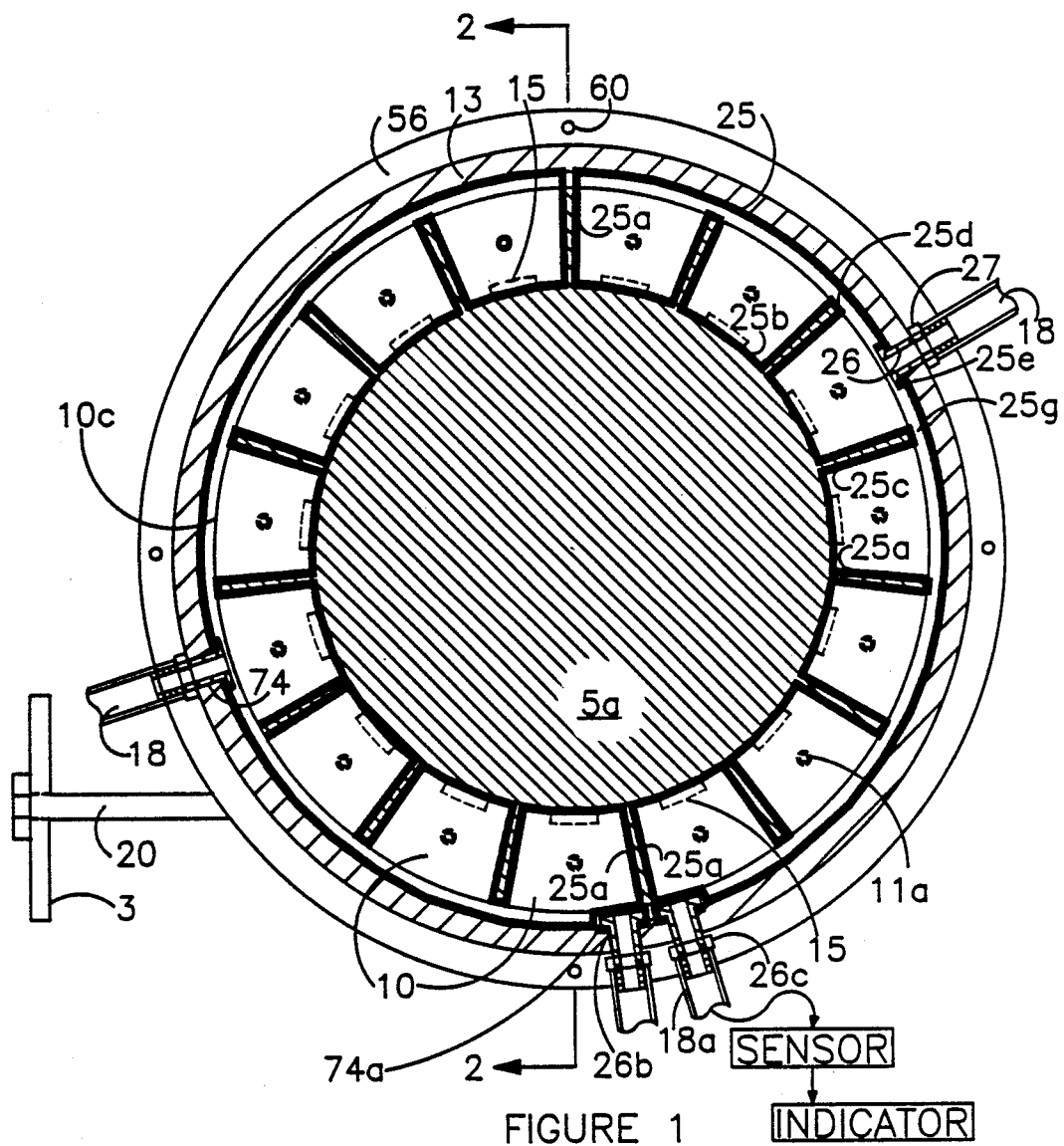

As shown in FIGS. 1-4, a pressure reducing valve of the invention includes a cylindrical valve body 5 having a central bore therein divided into an inlet chamber 6 and an outlet chamber 7 by a partition plate 5a which extends across the central bore perpendicularly to the bore's longitudinal axis. The partition plate is preferably formed integrally with the valve body such as by casting.

A plurality of flow control means receptacles 10 are formed in valve body 5 and are spaced circumferentially around the partition plate 5a. Each of the receptacles 10 form a passage extending between inlet chamber 6 and outlet chamber 7 around partition plate 5a. Each passage has an inlet portion 10a, FIG. 3, and an outlet portion 10b. The partition plate 5a separates the inlet portion 10a from the outlet portion 10b of each passage. Preferably, the receptacles and partition plate are located so that the inlet and outlet portion of each passage are symetrically located adjacent opposite faces of the partition plate 5a and are of equal size, as shown. The receptacles 10 extend radially through the valve body 5 to an outside passage access opening 10c, FIGS. 3 and 4, on the outside surface of valve body 5. The receptacles are shown as tapering inwardly toward the inside of the valve so that each of the receptacles 10 take the form of a truncated cone, see particularly FIG. 3.

Figure 2:
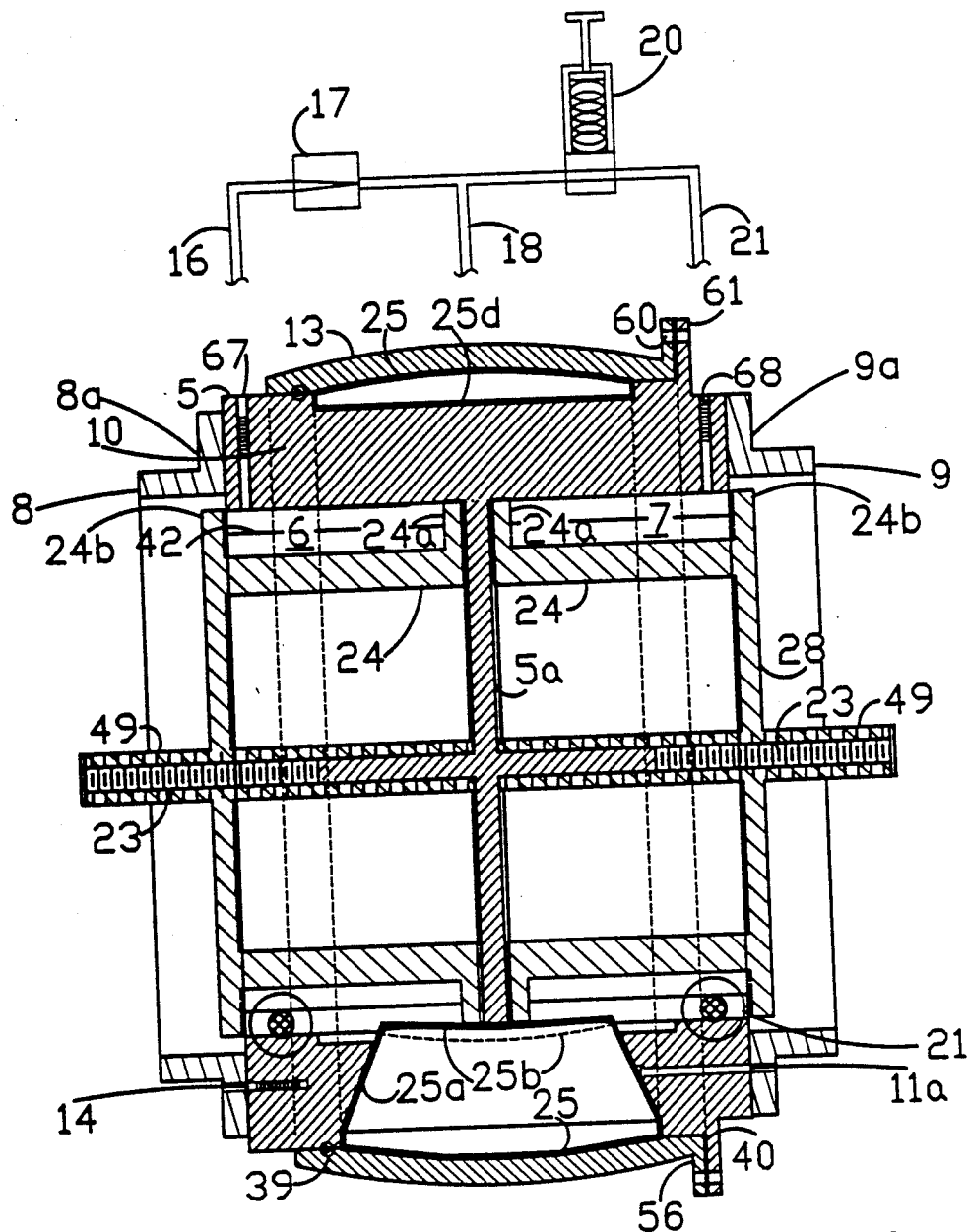
Figure 3:
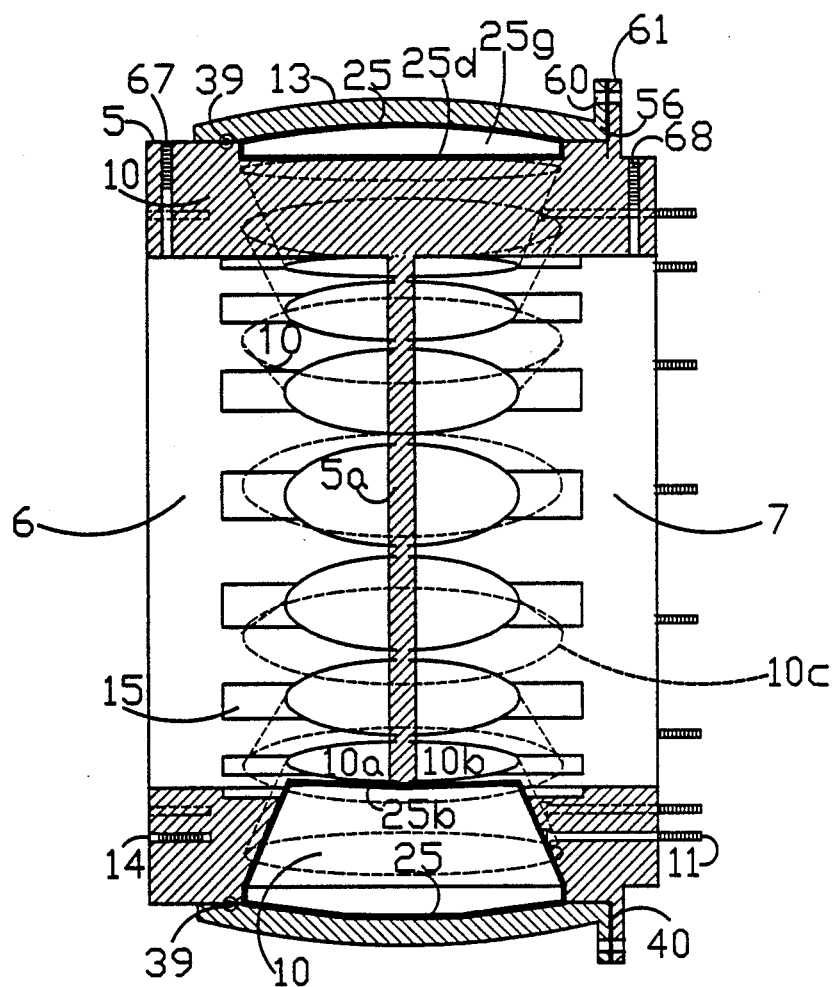
Figure 4:
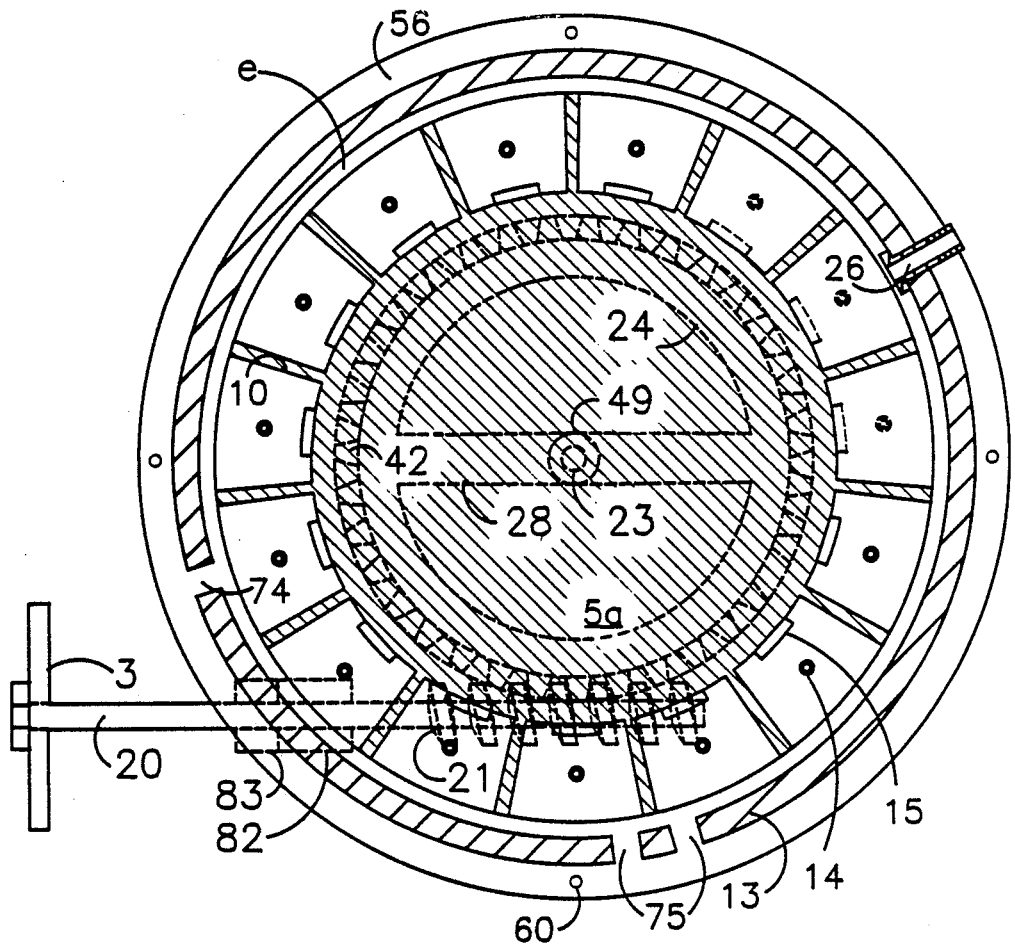

Elastomeric flow control means are shaped to fit into and be snugly received within the receptacles 10. These flow control means may conveniently take the form of elastomeric bladders 25. While a separate bladder control means could be provided for each receptacle, it is preferred that the bladder be formed to fit into several adjacent receptacles as shown in FIGS. 1 and 4 where one bladder 25 is shown as formed to fit into seven adjacent receptacles and a second bladder 25 is shown as formed to fit into the remaining eight adjacent receptacles. While a single common bladder could be formed to fit into all receptacles of the valve, it is preferred that the receptacles be divided into at least two sets with two independent bladders as shown. Sides 25b of the bladders are configured so that they can assume a position as shown in FIGS. 2 and 3 wherein they extend across passage inlet portion 10a and passage outlet portion 10b and seat against the portion of partition plate 5a therebetween to prevent communication between inlet 10a and outlet 10b. The bladder wall 25b, however, can be deformed to move away from partition 5a to allow communication between the inlet and outlet as shown by broken lines in FIG. 2.

The bladders 25 are held in the receptacles 10 by cover ring 13, which is secured in position over the receptacles by means of flange 56 along one side thereof which mates with flange 61 extending from valve body 5. Bolts, or other fasteners, extend through mating holes 60 in the two flanges may be used to secure the cover ring 13 to the valve body. With such construction, cover ring 13 can be easily released and slid away from flange 61 to either partially or completely expose the passage access openings 10c of the control means receptacles 10 to allow easy access to the receptacles for replacement. A gasket 40 between the abutting flanges and an "O"-ring 39 positioned in valve body 5 to bear against the inside edge surface of the cover ring opposite the edge with the flange, seal the cover ring against leakage when secured in place over the receptacles. If desired, the outside of the valve body could be tapered to facilitate movement of cover ring 13.

Each of the bladders 25 is provided with a connector 26, FIG. 1, communicating with the inside of the bladder and adapted to be connected to a source of pressurized fluid. Connectors 26 extend through openings 74 provided in cover ring 13. Connectors 26 are shorter than the depth of the receptacles 10 so that a bladder 25 may be easily installed by positioning it in the appropriate receptacle and depressing the connector into a receptacle thereby deforming the bladder to which it is attached and manuevering the connector under a portion of cover ring 13 to the appropriate receiving opening 74. The resilient nature of the bladder will generally push the connector through hole 74. The connector can then be sealingly secured to ring 13 by a nut 27 threaded onto the outside of the connector, or by a threaded hose connector which connects the bladder to a source of pressurized fluid. In either case, the base of the connector where attached to the bladder is covered with the elastomeric material of bladder 25 so hole 74 is sealed as the base of the connector is pulled against ring 13. Conduits 18 are attached to connectors 26 and extend to a source of pressurized fluid for pressurizing bladders 25.

The structure described so far provides a basic flow control and pressure regulating valve of the invention which is shown in this basic form in FIG. 3. The valve may be attached, as shown in FIG. 2, to the flange 8a of an inlet pipe or size reducer 8 by means of bolts threaded into mounting holes 14 and to flange 9a of outlet pipe or size reducer 9 by means of bolts 11, FIG. 3, passing from the flow control means receptacles 10 through openings 11a, FIG. 2, in valve body 5 and flange 9a. Either of the securement methods described can be used on either side of the valve, or other means could be used to secure the valve to mating pipes.

Passage 67, FIGS. 2 and 3, extends through valve body 5 to communicate with valve inlet chamber 6 and provide fluid at the inlet pressure through conduit 16, FIG. 2, to a needle valve 17. After passage through the needle valve, the fluid is provided to the interior of the bladder through conduit 18 and also to a control or pilot valve 20. From the pilot or control valve the fluid is connected through conduit 21 to passage 68 which extends through valve body 5 to communicate with outlet chamber 7. This is a standard pressure control system for pressure regulating valves and supplies pressurized fluid to the bladder to operate the valve. By adjustment of the control valve 20, any pressure between the inlet and outlet pressures of the valve of the invention can be maintained within the bladder 25. The system works in well known manner to adjust the pressure in bladder 25 so that the valve of the invention will maintain a constant output pressure regardless of the inlet pressure. Presently, it is anticipated that a separate control system connected to passages 67 and 68 should be used for each separate bladder used in the valve. Various other valve control systems can be used to supply pressurized fluid to the bladders 25, and, if independent control is desired, the bladders can be connected to a source of controlled pressurized fluid independent from the fluid being controlled by the valve.

In operation of the valve, when the pressure inside bladder 25 is substantially the same as the pressure of the fluid entering the valve and acting against walls 25b of bladder 25, the pressure inside bladder 25 is sufficient to hold bladder walls 25b against the partition plate 5a, as shown in solid lines in FIG. 2, thereby holding the valve in closed condition with walls 25b blocking flow of fluid between passage inlet portions 10a and passage outlet portions 10b. When the pressure of the fluid inside bladder 25 is reduced, bladder walls 25b are displaced from their seats against partition plate 5a, such as shown by broken lines in FIG. 2, thereby connecting passage inlet portions 10a and passage outlet portion 10b to allow flow of fluid through the valve around partition plate 5a. By adjusting the pressure supplied to a bladder 25, the displacement of bladder walls 25b and thus the amount of flow allowed around partition plate 5a can be accurately controlled.

Because a plurality of receptacles are provided in the valve and because separate bladders are used in connection with separate groups of these receptacles, if one of the bladders should rupture, the remaining one or more bladders will continue to operate to control pressure and flow through the valve. Thus, if two bladders are used, and one of the bladders ruptures, full flow may occur through the passages with the ruptured bladder and complete stoppage of flow and reduction to zero pressure of the output cannot occur. However, the remaining unruptured bladder will continue to operate and the valve will be effective to control the flow and pressure drop through the valve through an upper portion of the normal control range of the valve. The more independent bladders that are used, the less effect the rupture of one of the bladders will have on the operation of the valve, i.e., the larger will be the portion of the normal control range that remains effective. Thus, the number of independent bladders used can be chosen based upon the least allowable pressure drop between inlet and outlet of the valve, i.e., the maximum pressure allowed at the outlet of the valve. This is a significant advantage of the valve of the invention.

In order to provide an indication of a bladder rupture, a conduit 26b may be provided through an opening 75 in cover ring 13 located at an end of a bladder as shown in FIG. 1. A separate conduit 26b will be provided for each separate bladder used. Each conduit 26b is secured to cover ring 13 by nut 26c. Openings 75 are sealed by gaskets 74a. In normal operation of the valve, the bladder 25 covers and seals the opening to conduit 26b as shown in FIG. 1. If a bladder ruptures, the turbulence of the water flowing through the receptacles with the ruptured bladder is sufficient to dislodge the end of the bladder to the extent that fluid at substantially the inlet pressure enters conduit 26b. Conduit 26b is connected to a pressure sensor, which, upon sensing pressure in the conduit will generate a signal which is sent to an indicator means to activate the indicator means to provide an alarm or other indication of a ruptured bladder.

Another significant advantage of the valve of the current invention is that a bladder can be replaced without removing the valve from the line. The flow of fluid through the valve must be stopped, such as by a separate gate valve upstream of the valve of the invention. Then cover ring 13 is slid away from flange 56 to at least partially uncover the receptacles 10. The resilient bladders can then easily be removed and replaced as desired. With the embodiment of FIGS. 1–4, conduit 16 to needle valve 17 will have to be disconnected to allow cover ring 13 to be slid from its position over the receptacles. Since only a partial uncovering of the receptacles is necessary, it will generally not be necessary to remove the conduits 26b or the conduits 26 from cover ring 13 for the bladders not being replaced.

It should be realized that the number of receptacles 10 provided in the valve, the size of such receptacles, and the wall thickness between receptacles will vary with the size of the valve and the desired flow capacity of the valve. Also, the particular configuration of the passages can vary with the preferred configuration being the truncated cones illustrated, wherein, if the cones were extended, the apex of each cone would lie on the central longitudinal axis of the valve body. It is preferred that the side walls of the receptacles 10 slope inwardly, giving the truncated cone configuration illustrated or an alternate pyramid configuration, so that the pressurized fluid in the bladders against bladder walls 25a will work against the side walls and the bladders will remain seated against the side walls to prevent leakage of the fluid in the valve around and behind the bladders. In addition, the particular configuration of the portions of the partition plate 5a extending over the passages or recepticles 10 between the passage inlet and outlet portions may vary as may the configuration of bladder walls 25b which mate against such partition plate portions. It is preferred that the partition plate portions be semicircular as shown and that the bladder walls 25b be normally similarly semicircular or partially spherical, as shown, to provide good sealing characteristics. However, the portions of the partition plate over the passages could be semicircular away from the passages, oppositely to the configuration shown, so the partially spherically walls 25b would normally extend outwardly from bladder 25 to close the passages. This configuration could increase the flow capacity of the valve. Various other configurations could also be used.

Where the valve of the invention is to be used to reduce extremely high pressures, it may be desireable to include gates in the valve to help control the flow and pressure drop through the valve. With gates included in the valve, the valve becomes a two or three step reducing valve depending upon whether one or two gates are used. To provide gates in the valve of FIGS. 1–4, two shafts 23, FIG. 2, are secured to partition plate 5a with one shaft extending along the central longitudinal axis of the bore of the valve into the inlet chamber and the other shaft extending along the central longitudinal axis of the bore into the outlet chamber. With the particular embodiment shown in FIG. 2, the shafts 23 are threaded to receive thereon the threaded mounting hubs 49 of cylindrical gates 24. Arm rods 28, FIGS. 2 and 4, extend across the axis of the gate and secure the gate mounting hubs 49 to the cylindrical gate bodies 24. End flanges 24a and 24b are provided at opposite ends of the cylindrical gate bodies 24 and are sized to closely fit into either the valve inlet chamber 6 or valve outlet chamber 7, as appropriate. The arms, shaft, cylindrical gate body and flanges may be of single piece construction or may be built up from separate components. The outside circumference of each gate body 24 between the flanges is configured to provide longitudinally extending teeth 42 which engage worm gears 21 of drive rods 20 which extend through packing glands 82 and retaining nut 83 in valve body 5. Wheel handles 3 on the ends of drive rods 20 allow the drive rods to be easily turned to cause rotation of the gates on shafts 23. Rotation of the gates cause them to move longitudinally along shaft 23 toward or away from partition plate 5a, the direction of movement depending upon the direction of rotation of the shafts. With the embodiment of FIGS. 1–4, separate drive shafts are provided for each of the gates so each gate can be moved independently. Thus, gate 24 in inlet chamber 6 can be positioned to provide a controlled flow passage between the flange 24a and the partition plate while the gate 24 in outlet chamber 7 can be positioned to provide a controlled flow passage between its flange 24a and the partition plate. These passages may be set to provide a maximum flow and minimum pressure restriction while the bladder flow control means 25 provide flow and pressure regulation for the valve.

Figure 12:
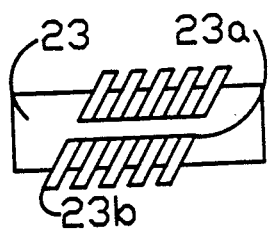
Figure 13:
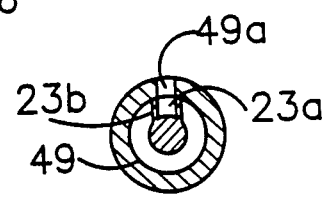

It is preferred that the threads 23b on shafts 23 be discontinuous, such as by having a channel 23a cut longitudinally through the threads, FIGS. 12 and 13, and that the gate mounting hubs 49 have holes 49a therethrough periodically along their length. This allows any deposits which build up on the threads of the shafts to be removed from the shafts and exuded through the holes 49a.

No seals are used with the gates shown in FIG. 2 so that with the gates in closed position shown in FIG. 2, there is still a small clearance between the gate body 24 and the partition plate 5a so some flow of fluid therebetween can occur. Thus, in order to replace a bladder 25, it is still necesary to shut off flow to the valve with a separate gate valve upstream of the illustrated valve.

As described above, with the valve of FIGS. 1–4, in order to replace a bladder, it is necessary to shut off the flow of fluid through the valve by use of an additional gate valve upstream of the valve of the invention. In some instances this is not a problem, but in many instances, it would be advantageous to eliminate the need for the separate gate valves which are generally required. As described above, the construction of the valve of the invention advantageously allows gates to be easily provided within the valve itself. These gates may be configured to include seals to thereby actually block flow through the valve when closed so that additional gate valves upstream or downstream of the valve of the invention are not needed.

Figure 5:
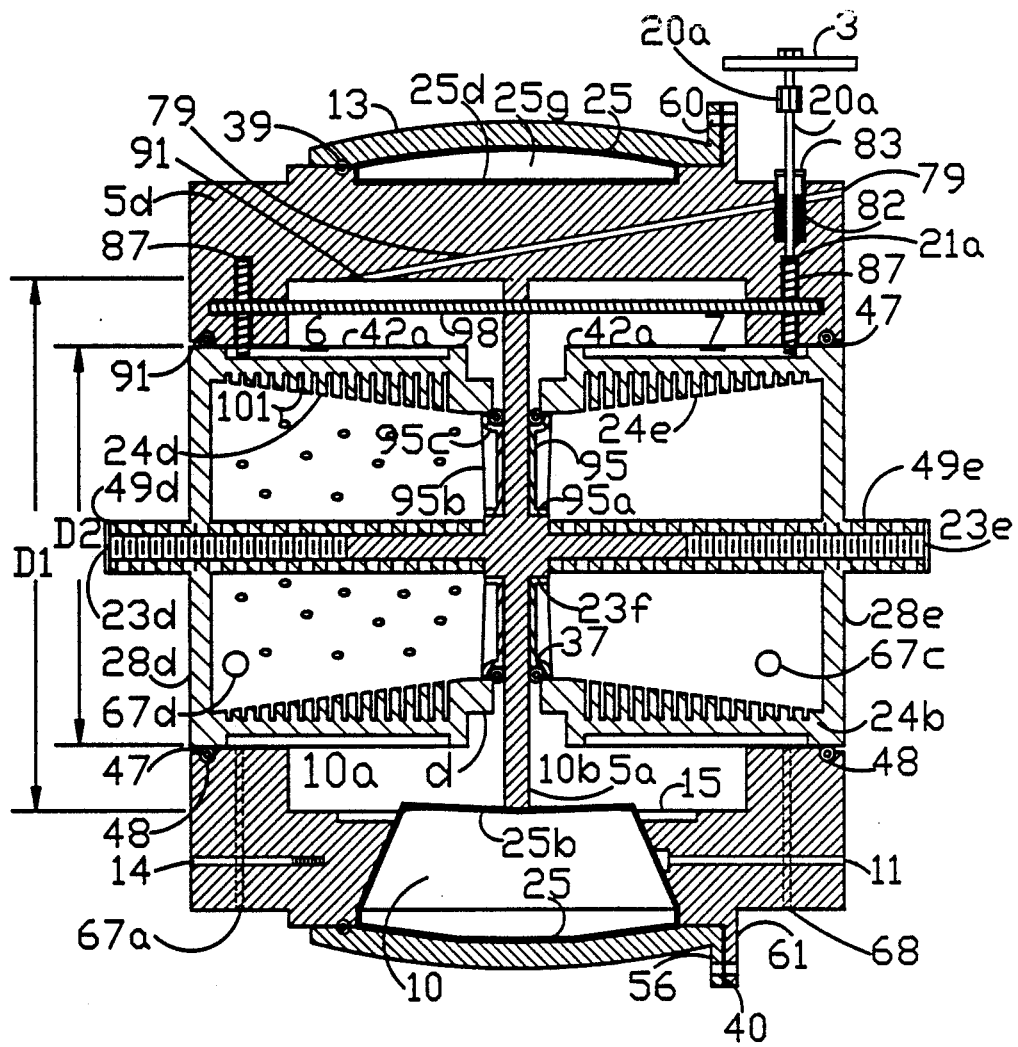
Figure 6:
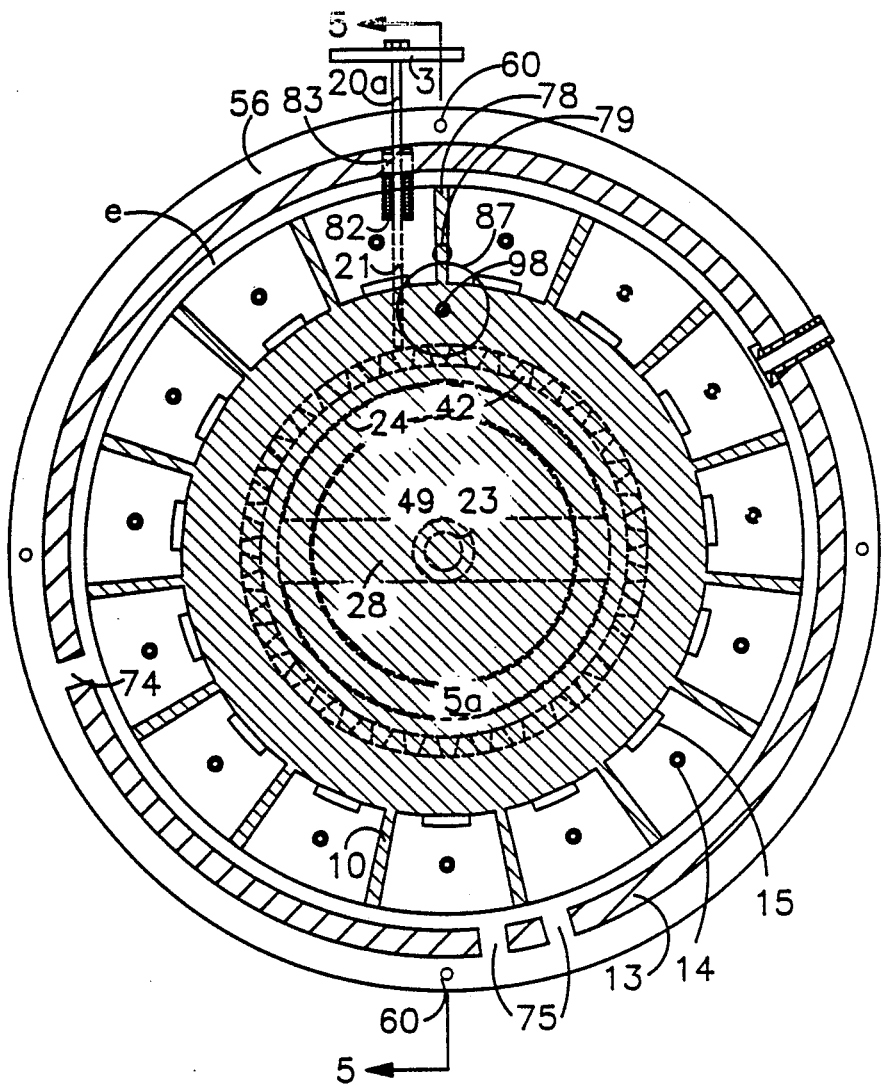

FIGS. 5 and 6 show an embodiment of a valve of the invention wherein the gates are provided with seals so completely stop flow through the valve when closed. Further, the valve has been modified so that the gates are moved simultaneously with a single gate control and the passage communicating with the inlet chamber of the valve has been modified so the conduit to the needle valve does not have to be removed in order to slide the cover ring from over the passage access openings.

As shown in FIGS. 5 and 6, a valve body 5d has a partition plate 5a and a plurality of passages 10 as in the embodiment of FIGS. 1-4. However, the embodiment of FIGS. 5 and 6 has an enlarged wall area 78, FIG. 6, between two of the passages 10 to provide space for a conduit 79 which extends from opening 91 connecting with valve inlet chamber 6 to an outlet 79b on the opposite side of the valve. This conduit 79 takes the place of conduit 67 of the embodiment of FIGS. 1-4 and moves the connection of conduit 16 to the opposite side of the valve so it does not interfer with the movement of cover ring 13.

Partition plate 5a has a threaded shaft 23d, FIG. 5, extending into inlet chamber 6 and threaded shaft 23e extending into outlet chamber 7. Each of these shafts has an enlarged threaded portion 23f adjacent the partition plate 5a to receive thereon a seal holding plate 95 with central, threaded mounting hub 95a. About the circumference of each plate 95 is a cupped rim 95c which holds a gasket 37. Plates 95 are provided with radial ridges 95b to make an acoustical, knurled surface.

Gate 24d is mounted for rotation on shaft 23d and identical gate 24e is mounted for rotation on shaft 23e. Gates 24d and 24e are tapered so that the central flow passage through the gates is reduced in size toward the partition plate. Each gate has longitudinal teeth 42a about its outer circumference to mate with pinions 87. Pinions 87 are secured to shaft 98 so that they rotate together. A worm 21a, FIG. 6, on drive rod 20a passing through packing glands 82 and retainer nut 83 engages one of the pinions 87. Rotation of drive rod 20a, by means of wheel handle 3, causes the pinion 87 with which it is engaged and shaft 98 to rotate, thus also rotating the other pinion 87 on shaft 98. Both gates 24d and 24e are thus rotated simultaneously.

When gates 24d and 24e are adjacent to partition plate 5a, as shown in FIG. 5, the inside edge of the gate contacts sealing gasket 37 to completely block all flow of fluid between the gates and the partition plate. A sealing gasket 47 in body groove 48 provides a seal about the outside of respective gates 24d and 24e to block any flow of fluid about the outside of the gates.

The inside surfaces of gates 24d and 24e are provided with a plurality of holes 101. These holes are provided to reduce the weight of the gates and also, importantly, to reduce the noise generated by flow of fluid through the gates.

Figure 7:
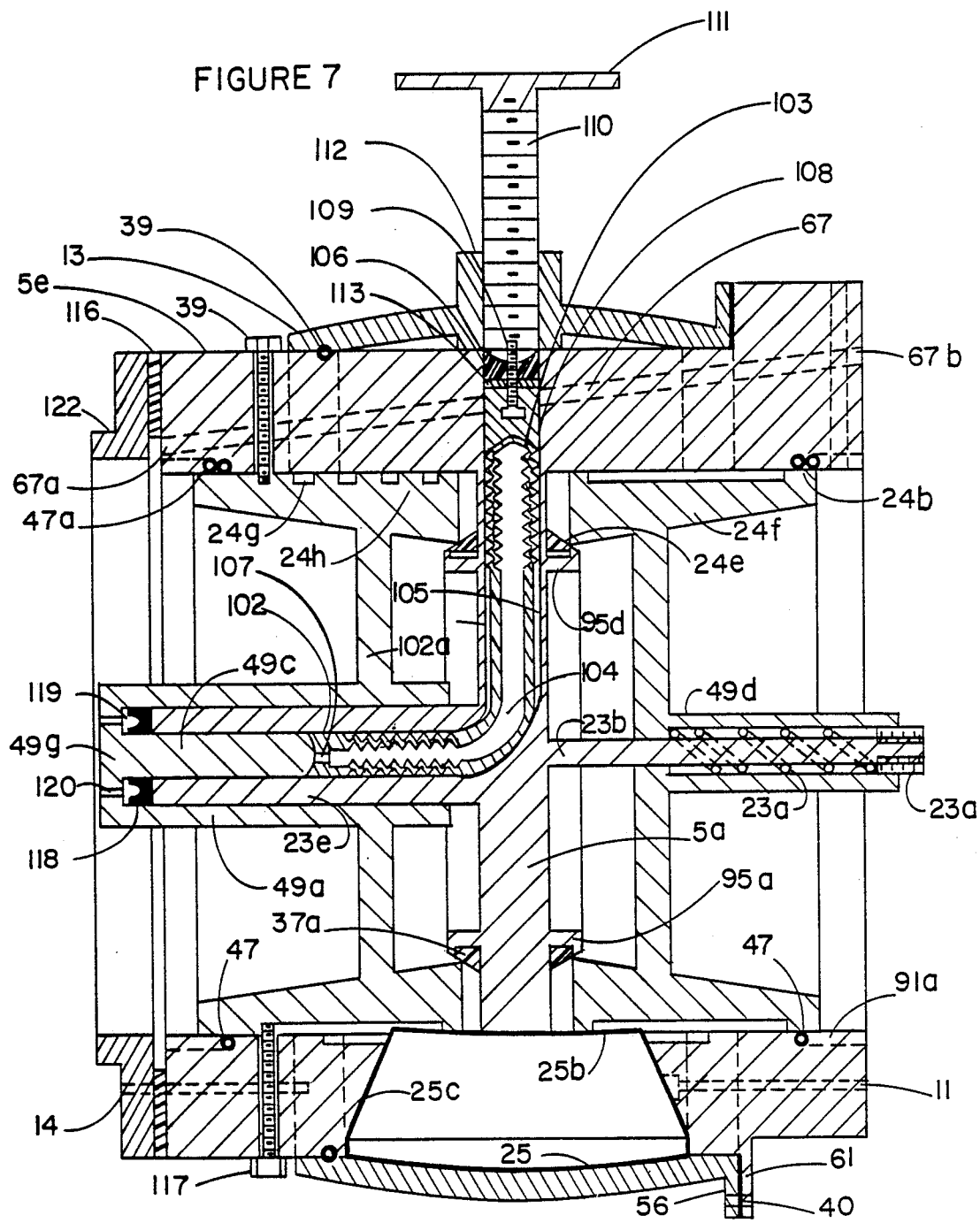

FIG. 7 shows another embodiment of a valve of the invention wherein the gate in the outlet chamber operates as a check valve and wherein a hydraulic control system is used to position the gate in the inlet chamber. In this embodiment, valve body 5f is similar to valve body 5d of FIG. 5, but does not include the pinion and associated drive mechanism for driving the gates. The partition plate 5a is of somewhat different configuration in that it has seal holders 95d formed therein for holding seals 37a. Extending from partition plate 5a into outlet chamber 7 is a smooth shaft 23b while extending into inlet chamber 6 is a hollow shaft 23e. The central bore 102 of hollow shaft 23e extends through partition plate 5a and valve body 5f as shown.

A gate 24h has a central mounting hub 49a adapted to be slidingly received on hollow shaft 23e. Shaft 49a has an end 49g with a central shaft projection 49c extending partially into shaft bore 102.

The inlet gate 24h is operated by a flexible, corrugated, hydraulic tube 104 which is filled with hydraulic fluid at 107 and then sealed. The corrugation is provided to said hydraulic tube 104 on its ends 102 and 103, and said corrugation may be either circular or helical. Hydraulic tube 104 is packed in hydraulic fluid 105 inside bore 102a inside the partition plate 5a. To contain the flexible hydraulic tube 104 packed in said hydraulic fluid, the radial leg of bore 102a is provided with a sliding cylindrical metallic stopper 106 seated over a flexible cupped sliding portion 108 which is an end extension of hydraulic tube 104, with a washer 113 between them. A bolt 109 is embedded in portion 108, and passes through stopper 106 and washer 113, but allows them free rotary movement. Bolt 109 is not attached to control rod 110. Threaded control rod 110, with wheel handle 111 on its end, is mounted in a elongated opening 112, provided in the cover ring 13, wherefrom it is lowered into said radial leg of bore 102 until its convex end meets the metallic concave end of stopper 106. Then, by rotary movement of wheel 111 and threaded rod 110, thrust is brought to bear against stopper 106, hydraulic tube end portion 108, and corrugated portion 103. Corrugated portion 103 will compress causing corrugated portion 102 at the opposite end of the tube to expand against shaft 49c of the gate 24h. Hence gate 24h is pushed toward the inlet of the valve and away from partition plate 5a. Alternately, or in conjunction with the contraction and expansion of opposite ends of the tube, the tube itself may slide in bore 102a. When the thrust is released, the incoming fluid flowing against the gate pushes the gate toward partition plate 5a. The gate 24h is preferably primed before it is opened. Once the gate is opened, it remains hydraulically balanced. A flexible cupped washer gasket 118 is mounted around the end of shaft 23e to make a positive seal between shaft 23e and shaft 49a, and it is held against the end of shaft 23e by means of admitting fluid pressure to bear against the washer gasket through an opening or openings 120 in the end 49g of the shaft 49a as at 119.

Gate 24h may have longitudinal teeth, or a longitudinal groove therein to mate with the end of bolt 117 to prevent gate 24h from rotating and may have a series of aligned receiving holes 24g spaced longitudinally along its length to recieve the end of bolt 116 in a selected hole to lock the gate in position.

A gate 24f with central mounting shaft 49b is slidably mounted on shaft 23b to operate as a check valve. Shaft 49b makes an enclosure for a coiled helic spring 23c which is retained by a threaded cap 23d. When the inlet gate 24h and the flow control means 25 are open, fluid pressure pushes check valve 24f away from partition plate 5a against the bias of spring 23c. If flow of fluid through the valve reverses, the reverse pressure of the fluid and the bias of the spring slams the valve 24f shut against seal 37a. Because of the conduit design of the check valve, its loss of energy is minimized compared with check valve having solid discs in the fluid passage way.

Gaskets 47 which seal around the outside of gates 24h and 24f are dead ended tube gaskets with openings in their hollow tube body, and are located at the two ends of the valve as shown in FIGS. 5 and 7. The cross lap of said gasket 47 is shown by 47a in FIG. 7. A notch for the ingress of fluid to reach gasket 47 is shown by 91 in FIG. 5. A receiving helical groove in the valve body provides the location for the gasket 47. The ends of the groove terminate into two tangential threaded openings located on opposite sides of the valve. Telescoping the stop portions 24b of gates, shown in FIGS. 5 and 7, closes said helical groove. With the aid of a steel tape or wire, the tube gasket 47 can be placed into its corresponding groove in the valve by fastening the steel tape to the gasket at one end, pushing it through one of the threaded openings until it reaches the opening on the other end of the valve, then retrieving said tape and end of gasket from the other said opening. The adjacent walls of the tube gasket in the looping section of the helical groove remain in touch as shown by 47a, FIG. 7, for a certain distance before they reach the threaded openings. Threaded caps are provided for the threaded openings to secure the dead ends of the gasket which have embedded bolts protruding from them.

Once the gasket 47 is internally energized with the fluid pressure, it makes a fluid tight seal against the gates.

The gasket 47 can be removed from its corresponding helical groove by simply pulling it out by one of its ends.

The valve body 5f may be secured to an inlet pipe 122 in the manner previously described, here with a gasket 121 positioned between pipe 122 and valve body 5f. Gasket 121 also spaces pipe 122 from valve body 5f to allow the inlet 67a of passage 67 to communicate with valve inlet chamber 6.

Figure 8:
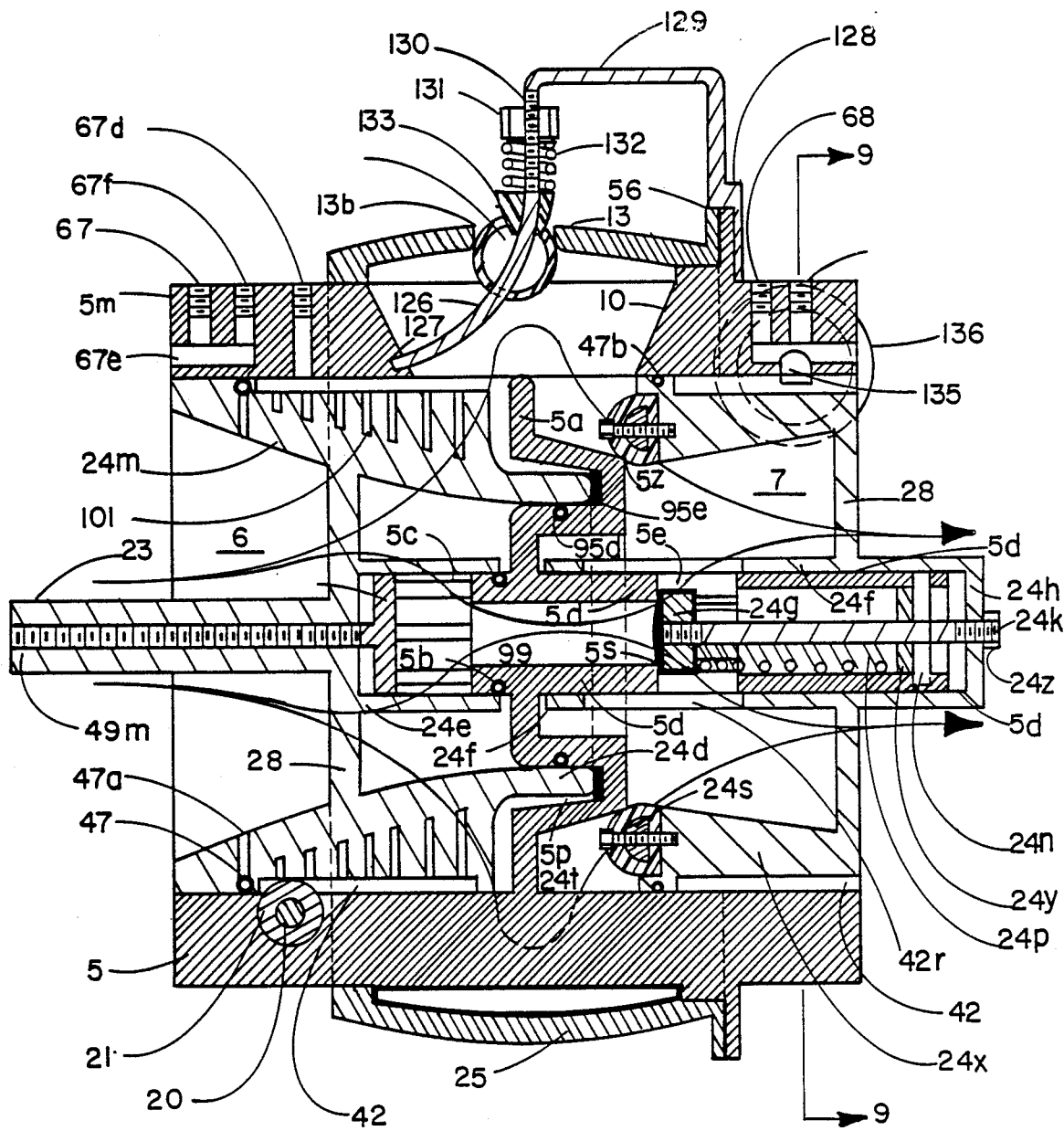

A further embodiment of the invention which includes an additional supplementary or auxiliary flow passage and flow control means is shown in FIGS. 8–11. As shown in FIG. 8, a valve body 5m similar to the valve bodies of the other valves illustrated, includes a plurality of passages or control means receptacle 10. These are circumferentially spaced about a partition plate 5a as has been described for previous embodiments. However, with the embodiment of FIG. 8, one of the passages 10, located to be at the top of the valve when installed, is left open and does not have a control means, such as the bladders of the previous embodiments, therein. The remaining passages all have the bladders therein as indicated for previous embodiments to control flow of fluid through the valve as previously described.

The partition plate of the embodiment of FIG. 8 is configured with a central passage 99 therethrough which provides an auxiliary flow passage for the valve. A closed, hollow shaft 5d extends from partition plate 5a into inlet chamber 6 and has a series of longitudinal slots 5c spaced circumferentially about the shaft in communication with central passage 99, FIGS. 8 and 10. A solid threaded shaft 23 extends from the dead end 5x of hollow shaft 5d. A gate 24m with threaded mounting hub 49m is mounted for rotation on shaft 23. Gate 24m has a cylindrical sleeve 24e which fits closely over hollow shaft 5d in inlet chamber 6. The forward end 24d of gate 24m is adapted to be sealingly received within an annular receiving space 5p in partition plate 5a. Thus, when gate 24m is rotated to cause movement of the gate to its extreme toward partition plate 5a, this extreme position is shown in FIG. 8, the forward end 24d of the gate is received in annular receiving space 5p and seals 95d and 95e prevent any flow of fluid about end 24d of the gate. Seal 47 about the opposite end of the gate prevents flow of fluid around the outside of the gate. In this position, gate sleeve 24e fits completely over slots 5c in shaft 5d to block those slots and engages seal 56 to prevent flow of fluid around the open end of the sleeve.

Hollow shaft 5d also extends from partition plate 5a into outlet chamber 7. Shaft 5d is configured so that a shoulder 5s is formed in passage 99 intermediate its length into outlet chamber 7. Slots 5e are spaced circumferentially around shaft 5d and extend a short distance outwardly from shoulder 5s toward the end of shaft 5d. Gate 24x in the outlet chamber 7 has a central mounting hub 24f which is slidably mounted on hollow shaft 5d. Piston rod 24k is secured to the end 24h of mounting hub 24f by means of a nut 24z. Thus, the gate 24x and piston 24q will move together along shaft 5d. A piston 24q covered with resilient seal material is secured to the end of piston rod 24k and is adapted to sealingly seat against shoulder 5s inside hollow shaft 5d. A spring 24p is mounted in the end of shaft 5d between piston 24q and retaining washer 24y which is held in place toward the end of shaft 5d by bolts 24n. Spring 24p biases piston 24q to its closed position against shoulder 5s and also biases valve 24s toward partition plate 5a whereby seals 24s covered with resilient seal material and held in place on gate 24x by bolts 24t abut a corner 5z of partition plate 5a to close the outlet portions of flow passages 10. A seal 47b seals against flow around the outside of gate 24x. Gate 24x has longitudinal teeth 42 about at least a portion of its circumference as shown in FIG. 9 which mate with a rack 135 mounted on valve body 5m for limited longitudinal motion.

Figure 11:
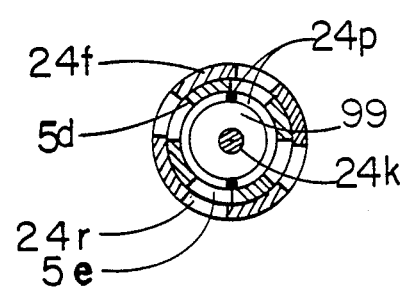

Valve mounting hub 24f extends closely over hollow shaft 5q and has slots 24r therein. Slots 24r are substantially longer than slots 5e in shaft 5d. Slots 5e and 24r are arranged as shown in FIG. 11 so that gate hub 24f can be rotated to fully align the slots as shown in FIG. 11, to partially align the slots, or to completely misalign the slots, thereby completely closing passage 99 to outlet chamber 7. Thus, by rotating gate 24x, control of flow through slots 5e and 24r can be achieved.

Figure 9:
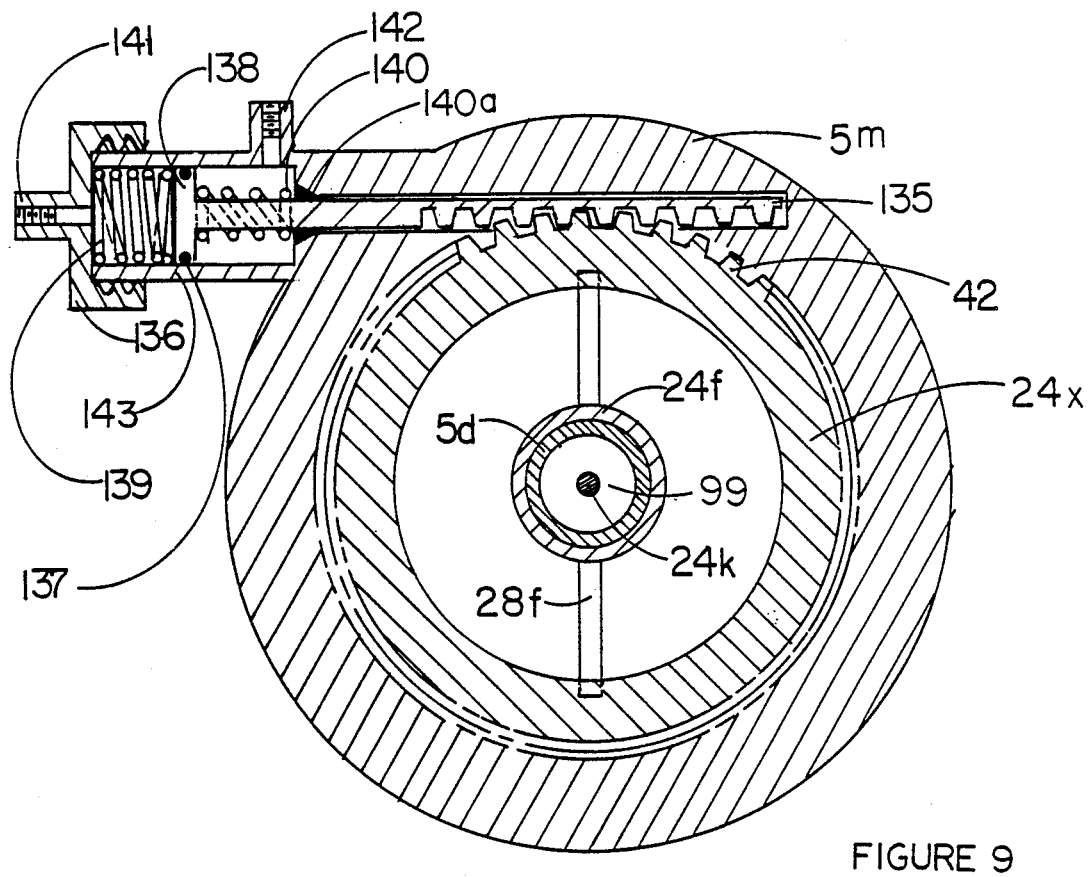
Figure 10:
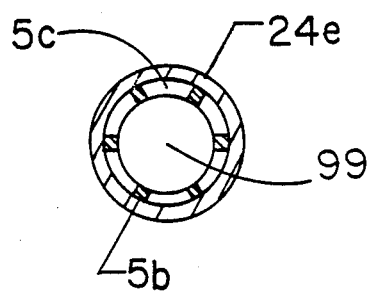

Rotational control of gate 24x is achieved by moving rack 135 as shown in FIG. 9. The end of rack 135 is mounted on piston 138 positioned in cylinder 143 forward on valve body 5m. Piston 138 and cylinder 143 form a double acting cylinder and piston assembly. A fluid inlet 141 in cylinder end 136 is connected to a source of pressurized fluid to cause movement of piston 138 toward the opposite end of the cylinder and a fluid inlet 142 is connected to a source of pressurized fluid to cause movement of piston 138 toward cylinder end 136. Springs 139 and 140 in cylinder 143 urge piston 138 to a set position when the pressures on opposite sides of piston 138 are equal; spring 140 keeps the seal 140a secured in place. "O"-ring 137 seals piston 138 in cylinder 143. The function of fluid inlets 141 and 142 is the same as previously described for bladders 25 to actuate and rotate the gate 24x and control fluid flow based on the difference in pressure across the valve. For example, inlet 141 can be connected to the inlet chamber of the valve such as through passage 67f to provide fluid at inlet pressure to that end of cylinder 143 and passage 142 can be connected between a needle valve to the control valve to provide an adjustable fluid pressure to that side of cylinder 143 as described above for control of bladders 25. The pressure difference, in conjunction with springs 139 and 140 will establish a position for piston 138 in cylinder 143. With this arrangement, gate 24x will be rotated and flow through slots 5e and 24r will be adjusted to maintain a controlled output pressure.

In addition to controlling flow from passage 99 to outlet chamber 7 by rotation of gate 24x, piston 24q in conjunction with shoulder 5s also controls flow. However, gate 24x is free to slide on shaft 5d against the bias of spring 24p to move piston 24q away from shoulder 5s thereby opening the passage 99 through the partition plate into outlet chamber 7. The relative length of slots 5e and 24r are such that the slots 24r will encompass the entire length of slots 5e regardless of the longitudinal position of gate 24x along shaft 5d. Thus, the flow control provided by rotation of gate 24x is not affected by its longitudinal position along shaft 5d.

In operation of the valve of FIGS. 8–11, inlet gate 24m is rotated by means of a worm gear 21, mounted on control rod 20, which engages longitudinal teeth 42 on the periphery of gate 24m. Rotation of gate 24m causes it to move longitudinally along shaft 23. The configuration of gate sleeve 24e and gate forward end 24d is such that as the gate 24m moves away from partition plate 5a, sleeve 24e uncovers slots 5c to a substantial degree before opening a passage around gate forward end 24d to passages 10. Thus, the inlet fluid is first allowed to flow through slots 5c into auxiliary passage 99. When fluid under pressure enters auxiliary passages 99, it flows against piston 24q pushing it back against the bias of spring 24p to open the passage to flow around piston 24q and through slots 5e and 24r. Flow and pressure regulation through passage 99 is now controlled by rotation of outlet gate 24x. As inlet gate 24m is opened further, flow will occur through passages 10 and such flow will be controlled as explained above by flow control bladders 25. During shutoff of flow through the valve, gate 24m is rotated to move it toward partition plate 5a. Flow will initially be shut off through passages 10 and then through auxiliary passage 99. Such staged shutoff of fluid flow through the valve helps prevent excessive pressure build up and pressure shocks upstream of the valve. With the construction of outlet gate 24x, if any back flow in the valve occurs, gate 24x immediately closes.

With the embodiment of FIGS. 8–11, one of the passages 10 is left open and does not include a flow control means, such as bladder 25, therein. Rather, an air flow control valve is positioned in the empty passage. This empty passage 10 is shown at the top of the valve of FIG. 8. An opening 13b is provided in cover ring 13 over open passage 10. A valve guide support 129 is secured to valve body 5 by mounting bracket 128. The portion of valve guide support 129 over opening 13b is threaded as at 130 and has a threaded spring holder 131 received thereon with spring 132 and seal 133 extending therefrom toward opening 13b. The height of seal 133 above opening 13b is adjusted by rotation of spring holder 131. Valve guide support 129 has an actual valve guide section 126 which is an arc of a circle extending through opening 13b into passage 10 and into a receiving opening 127 in valve body 5. A float 125 is slidably mounted on guide 126 so that it can freely move within passage 10 along the guide.

When the flow of fluid is shut off by means of inlet gate 24m to passage 10, float 125 falls under the influence of gravity and atmospheric air pressure along guide 126 into passage 10 thereby opening opening 13b so that passage 10 communicates with the atmosphere. In such position, when a vacuum is being created downstream of the valve, air at atmospheric pressure acting on seals 24s will cause gate 24x to move against the bias of spring 24p and allow air to flow into downstream piping.

When the valve is being operated to fill downstream piping, it is common to fill such pipes slowly. Thus, the inlet gate 24m will be opened to allow flow through passage 99 for filling the downstream pipes. During filling, as air pressure builds up, since outlet gate 24x is open under the influence of flow through passage 99 against piston 24q, the pressurized air will flow around seal 24s which is also open and out opening 13b.

As gate 24m is opened further to allow flow of fluid through passages 10, the fluid flowing through passage 10 without the flow control means therein will cause float 125 to move up guide 126 into opening 13b to seal such opening.

During substantial flow through both auxiliary passages 99 and flow passages 10, the flow coming from passages 99 through slots 5e and flow coming through passages 10 around seal 24s will meet in the outlet chamber 7 to reduce cavitation of the flow through the chamber. Gate 24m and check valve 24x are configured as reducers, which provides smooth transition for the flow at the inlet and at the outlet of the valve.

The gate 24m of the valve of FIGS. 8–11 has holes 101 provided therein to reduce weight and also reduce noise. Passages 47d in gate 24m provide fluid pressure to hollow seals 47. Passages 67 and 67f extend from compartment 67e which communicates with valve inlet chamber 6 to provide inlet pressure fluid for control and priming purposes, and passage 67d allows fluid to flow into the valve on the downstream side of gate 24m to prime such gate. The priming equalizes the fluid pressure on both sides of gate 24m so it is easier to rotate. Passages 68 and 68a communicate with the outlet chamber 7 of the valve. With any of the valves discussed, while passages are provided to communicate with the inlet and outlet chambers of the valve for control purposes, such connections could easily be made, and are commonly made, in the lines upstream and downstream from the valve.

It will be realized with the valve of FIGS. 8–11, the valve has additionally flow capacity over the other embodiments disclosed. This is because the flow through auxiliary passage 99 adds to the flow that can be obtained through passages 10.

It will also be realized that the diameter of the pipes or reducers to which the valve is attached does not have to be the same as the diameter of the inlet chamber of the valve. Thus, as shown in FIG. 5, the inlet to the valve has a diameter D2 while the pipe to which it is connected may have a larger diameter of D1.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A flow control and pressure reducing valve, comprising:
   a valve body having an inlet chamber and an outlet chamber therein;
   a partition means within said valve body separating the inlet chamber and outlet chamber;
   a plurality of tapered receptacles extending through the valve body from a relatively small inner end which opens to the inlet chamber, the partition means, and the outlet chamber, to a relatively large outer end opening to outside the valve body in an access opening, whereby flow control means can be placed in each receptacle from outside the valve body through said access opening, and whereby the receptacles each form a passage means extending through the valve body from the inlet chamber to the outlet chamber around the partition means;
   elastomeric flow control means located in each of said receptacle means and responsive to pressurized fluid introduced into said flow control means to controllably restrict said passage means;
   means for supplying pressurized fluid to said flow control means for controllably restricting each of said passage means to thereby control flow of fluid through the valve; and
   means for covering and sealing said access openings.

2. A flow control and pressure reducing valve according to claim 1, wherein each receptacle is in the form of a truncated cone extending radially through the valve body.

3. A flow control and pressure reducing valve according to claim 2, wherein the apex of each truncated cone, if the cone was extended, would be on the center axis of the valve body.

4. A flow control and pressure reducing valve according to claim 1, additionally including at least one conduit means having an open end in communication with at least one receptacle and positioned such that its open end is normally sealed by the flow control means in the receptacle but, if a flow control means ruptures, the ruptured flow control means will no longer seal the open end of the conduit means and pressurized fluid from the inlet of the valve will enter the conduit means, and sensing means in communication with said conduit means to sense if pressurized fluid enters said conduit means and to provide a signal upon sensing pressurized fluid entering the conduit means.

5. A flow control and pressure reducing valve according to claim 1, wherein the partition means divides each passage means into equal size inlet and outlet portions.

6. A flow control and pressure reducing valve according to claim 1, wherein the elastomeric flow control means is at least one bladder means configured to fit into and be received by the receptacles.

7. A flow control and pressure reducing valve according to claim 6, wherein the at least one bladder means is a plurality of bladders, each configured to fit into and extend between several adjacent receptacles.

8. A flow control and pressure reducing valve according to claim 7, wherein each of the plurality of bladders has its own means for supplying pressurized fluid to the bladder.

9. A flow control and pressure reducing valve according to claim 7, wherein each of the means for supplying pressurized fluid to a bladder comprises a conduit communicating with the interior of the bladder and adapted to be attached to a source of pressurized fluid.

10. A flow control and pressure reducing valve according to claim 1, additionally including an inlet gate; means for mounting the inlet gate in the inlet chamber of the valve body; and means for positioning the inlet gate in the inlet chamber so as to restrict to a desired degree the flow of fluid through the inlet chamber of the valve.

11. A flow control and pressure reducing valve according to claim 10, additionally including an outlet gate and means for mounting the outlet gate in the outlet chamber of the valve body.

12. A flow control and pressure reducing valve according to claim 1, additionally including a passage means extending through the valve body from the inlet chamber to the outlet chamber around the partition means and communicating with the atmosphere outside the valve body, and air flow control means positioned in the passage to allow selected flow of air between the passage and the atmosphere, but block flow of fluid being controlled by the valve from the valve to the atmosphere.

13. A flow control and pressure reducing valve according to claim 12, wherein the additional passage means is positioned at the top of the valve and wherein the air flow control means includes a float means positioned to open the passage to the atmosphere under the influence of gravity, but to close the passage to the atmosphere when subjected to flow of fluid to be controlled by the valve through the passage.

14. A flow control and pressure reducing valve according to claim 1, wherein the tapers of each receptacle are such that if such tapers were continued inwardly of the inner end of the receptacle, they would all intersect on the central axis of the valve body.

15. A flow control and pressure reducing valve according to claim 1, wherein the elastomeric flow control means are bladder means configured to fit into and be received by the receptacles.

16. A flow control and pressure reducing valve according to claim 15, wherein the bladder means is at least one elongate bladder having a plurality of formed bladder extensions extending from one side thereof and each extension being configured to be received in a receptacle and spaced along the bladder so that the bladder can extend about the outside of the valve body over a plurality of access openings with bladder extensions extending through each of the covered access openings into the respective receptacles covered by the bladder, and wherein the means for securing the flow control bladder means in the recptacles holds the at least one bladder in place over the receptacles.

17. A flow control and pressure reducing valve according to claim 16, wherein a plurality of elongate bladders are provided, each elongate bladder covering a plurality of adjacent receptacles.

18. A flow control and pressure reducing valve according to claim 15, wherein a plurality of adjacent bladder means are formed so as to be communicatively joined.

19. A flow control and pressure reducing valve, comprising:

a valve body having an inlet chamber and an outlet chamber therein;

a partition means within said valve body separating the inlet chamber and outlet chamber;

a plurality of passage means extending through the valve body from the inlet chamber to the outlet chamber around the partition means, each of said passage means being divided by the partition means into an inlet portion opening into the inlet chamber and an outlet portion opening into the outlet chamber, and each of said passage means extending through the valve body and opening through an access opening to outside the valve body to form a receptacle for a flow control bladder means which can be placed in the receptacle from outside the valve body;

elastomeric flow control bladder means configured to fit within the flow control means receptacles and responsive to pressurized fluid introduced thereinto to controllably move a portion thereof in each receptacle between a position wherein said portion is seated against the partition means dividing the inlet portion of the passage from the outlet portion of the passage to thereby close the passage means, and a position wherein said portion is displaced from the partition means a preset maximum distance to fully open said passage means, to thereby control flow of fluid through said passage means;

means for supplying pressurized fluid to said flow control bladder means for controllably restricting each of said passage means to thereby control flow of fluid through the valve; and means for securing the flow control bladder means in the receptacles.

20. A flow control and pressure reducing valve according to claim 19, additionally including a passage means extending through the valve body from the inlet chamber to the outlet chamber around the partition means and communicating with the atmosphere outside the valve body, and air flow control means positioned in the passage to allow selected flow of air between the passage and the atmosphere, but block flow of fluid being controlled by the valve from the valve to the atmosphere.

21. A flow control and pressure reducing valve, comprising:

a valve body having an inlet chamber and an outlet chamber therein;

a partition means within said valve body separating the inlet chamber and outlet chamber;

a plurality of passage means extending through the valve body from the inlet chamber to the outlet chamber around the partition means, said passage means each being divided by the partition means into an inlet portion opening into the inlet chamber and an outlet portion opening into the outlet chamber;

elastomeric flow control means located in said passage means and responsive to pressurized fluid introduced into said flow control means to controllably restrict said passage means;

means for supplying pressurized fluid to said flow control means for controllably restricting each of said passage means to thereby control flow of fluid through the valve;

inlet gate means;

means axially mounting the inlet gate means in the inlet chamber for limited travel in the axial direction between a closed position wherein the inlet gate means substantially blocks flow of fluid through the inlet chamber of the valve and an open position wherein the inlet gate means does not substantially block flow of fluid through the inlet chamber of the valve; and means for controllably moving the inlet gate means within the inlet chamber to positions between its open and closed position.

22. A flow control and pressure reducing valve according to claim 21, wherein the means for mounting the inlet gate means in the inlet chamber is a mounting shaft extending into the inlet chamber from the partition means, and wherein the inlet gate means includes a mounting hub adapted to be received on said mounting shaft for controlled longitudinal movement therealong.

23. A flow control and pressure reducing valve according to claim 22, wherein the mounting shaft is threaded and the mounting hub is hollow and internally threaded so as to be received on the threaded mounted shaft, and wherein the means for positioning the inlet gate in the inlet chamber is means to rotate the inlet gate in the chamber to cause longitudinal movement of the inlet gate along the shaft.

24. A flow control and pressure reducing valve according to claim 23, wherein the threads on the mounting shaft are discontinuous and wherein holes are provided through the mounting hub so that material which builds up on the threaded shaft is released from the shaft as the hub rotates thereon and is exuded through the holes.

25. A flow control and pressure reducing valve according to claim 22, wherein the mounting shaft is smooth, the mounting hub has a smooth bore therein open at one end to receive therein the end of the mounting shaft and to be slidable therealong and closed at its opposite end, and wherein the means for positioning the gate comprises means for sliding the gate along the mounting shaft.

26. A flow control and pressure reducing valve according to claim 25, wherein the means for sliding the gate along the mounting shaft is partially located interiorly of the mounting shaft and acts internally on the mounting hub of the gate.

27. A flow control and pressure reducing valve according to claim 26, wherein the means for sliding the gate is hydraulically actuated.

28. A flow control and pressure reducing valve according to claim 21, additionally including:

outlet gate means;

means axially mounting the outlet gate means in the outlet chamber for limited travel in the axial direction between a closed position wherein the outlet gate means substantially blocks flow of fluid through the outlet chamber of the valve and an open position wherein the outlet gate means does not substantially block flow of fluid through the outlet chamber of the valve.

29. A flow control and pressure reducing valve according to claim 28, wherein the means for mounting the outlet gate means in the outlet chamber is a mounting shaft extending into the outlet chamber from the partition means, and wherein the outlet gate means includes a mounting hub adapted to be received on said mounting shaft for longitudinal movement therealong.

30. A flow control and pressure reducing valve according to claim 29, wherein the outlet gate means is mounted on the mounting shaft extending into the outlet chamber for controlled longitudinal movement therealong and wherein means are included for positioning the outlet gate in the outlet chamber so as to restrict to a desired degree the flow of fluid through the outlet chamber of the valve.

31. A flow control and pressure reducing valve according to claim 29, wherein the outlet gate means is freely slidably mounted on the mounting shaft extending into the outlet chamber to act as a check valve whereby flow of fluid through the valve from inlet chamber to outlet chamber will cause the outlet gate means to slide along said mounting shaft to an open position and reverse flow in the valve will cause the outlet gate means to slide along said mounting shaft in the opposite direction to closed position to block back flow of fluid through the valve.

32. A flow control and pressure reducing valve, comprising:

a valve body having an inlet chamber and an outlet chamber therein;

a partition means within said valve body separating the inlet chamber and outlet chamber;

a plurality of passage means extending through the valve body from the inlet chamber to the outlet chamber around the partition means, said passage means each being divided by the partition means into an inlet portion opening into the inlet chamber and an outlet portion opening into the outlet chamber;

elastomeric flow control means located in said passage means and responsive to pressurized fluid introduced into said flow control means to controllably restrict said passage means;

means for supplying pressurized fluid to said flow control means for controllably restricting each of said passage means to thereby control flow of fluid through the valve;

an auxiliary passage extending centrally through the partition means;

inlet gate mounting means extending from the partition means into the inlet chamber and associated with said auxiliary passage;

an inlet gate mounted for controlled longitudinal movement along the inlet gate mounting means; and means associated with the inlet gate for controlling the opening of the auxiliary passage to control flow of fluid through the auxiliary passage whereby the opening of the auxiliary passage is controlled by the positioning of the inlet gate along the inlet gate mounting means.

33. A flow control and pressure reducing valve according to claim 32, wherein the outlet gate mounting means extend from the partition means into the outlet chamber and is associated with the auxiliary passage; wherein an outlet gate is mounted for controlled rotation on the outlet mounting means; and wherein the means for controlling the opening of the auxiliary passage into the outlet chamber is controlled by the relative rotation of the outlet gate on the outlet gate mounting means.

* * * * *